United States Patent
Liu

(10) Patent No.: US 7,539,792 B2
(45) Date of Patent: May 26, 2009

(54) DATA DISTRIBUTION METHOD AND SYSTEM HAVING A STREAM BUFFER DEVICE WITH A SUB-BUFFER TABLE FOR RECORDING THE STATE OF A PLURAITY OF CORRESPONDING SUB-BUFFERS

(75) Inventor: Chi Wei Liu, Taipei County (TW)

(73) Assignee: Lite-On Technology Corporation, Taipei (TW)

( * ) Notice: Subject to any disclaimer, the term of this patent is extended or adjusted under 35 U.S.C. 154(b) by 493 days.

(21) Appl. No.: 11/390,661

(22) Filed: Mar. 27, 2006

(65) Prior Publication Data

US 2006/0288135 A1 Dec. 21, 2006

(30) Foreign Application Priority Data

Jun. 17, 2005 (TW) .............................. 94120162 A

(51) Int. Cl.
*G06F 5/00* (2006.01)
*G06F 13/00* (2006.01)

(52) U.S. Cl. .............................. 710/52; 710/53; 710/54; 370/426.1; 370/498

(58) Field of Classification Search ............. 710/52–54; 370/426.1, 498
See application file for complete search history.

(56) References Cited

U.S. PATENT DOCUMENTS

| 7,111,119 | B2 * | 9/2006 | Minowa | 711/114 |
| 7,428,239 | B1 * | 9/2008 | Seigneurbieux | 370/418 |
| 2003/0122959 | A1 * | 7/2003 | Ishida et al. | 348/426.1 |
| 2003/0188007 | A1 * | 10/2003 | Unger | 709/232 |
| 2004/0189623 | A1 * | 9/2004 | Dunn et al. | 345/204 |
| 2006/0268939 | A1 * | 11/2006 | Dries et al. | 370/498 |

\* cited by examiner

*Primary Examiner*—Tammara Peyton
(74) *Attorney, Agent, or Firm*—Quintero Law Office

(57) ABSTRACT

A stream data buffer device suitable for a client program comprises a buffer having N numbered sub-buffers, a buffer agent having a sub-buffer table recording a state of a corresponding sub-buffer, wherein the state comprising a first state and a second state, and a FIFO queue to record numbers of the sub-buffers having the fist state. When client program receives and stores stream data to stream data buffer, client program requests for a first sub-buffer having second state to store, and after storage, buffer agent changes the state of first sub-buffer to first state and transmits the number of the first sub-buffer to the FIFO queue. When a number of a second sub-buffer having the first state is available, the client program pops the number of second sub-buffer out of FIFO queue and accesses the data thereof, and the buffer agent changes the state of second sub-buffer to second state.

12 Claims, 5 Drawing Sheets

DATA DISTRIBUTION METHOD AND SYSTEM HAVING A STREAM BUFFER DEVICE WITH A SUB-BUFFER TABLE FOR RECORDING THE STATE OF A PLURAITY OF CORRESPONDING SUB-BUFFERS

BACKGROUND

The invention relates to a data buffer, and more particularly to a novel stream data buffer device and an access method thereof.

In general, client program, such as media players, utilize a buffer to temporarily store received streaming media data. When the buffer is full, the client program plays the media data. FIG. 1 is a schematic diagram of a conventional data buffer device. The data buffer device 12 comprises two buffers, first buffer 13 and second buffer 14, to alternatively store the stream data. When the client program 11 connects to a server providing the stream data (not shown in FIG. 1), the client program receives the stream data through the receiving port 15 and the receiving port 15 stores the stream data in first buffer 13. If the first buffer 13 is full, the receiving port 15 stores the stream data in the second buffer 14 and the client program 11 reads the stream data of the first buffer 13. If the stream data of the first buffer 13 is completely read and the second buffer 14 is full, the client program 11 reads the stream data of the buffer 14. If the stream data of the first buffer 13 is completely read and the second buffer 14 is not full, the client program 11 reads the stream data of the buffer 14 until the second buffer 14 is full. Thus, the operating performance of the client program is affected by the buffer size. If the buffer size, such as the first buffer 13, is too large, the time required to fill it with data increases. If the buffer size, such as the first buffer 13, is too small, the buffers may fill rapidly, thus, the receiving port 15 can not receive any more data. This affects the playback speed.

Consequently, the conventional buffer of FIG. 1 is not well suited to an embedded system as it cannot provide additional memory for the client program 11. It is desirable that a novel stream data buffer device with smaller memory and higher performance and an access method thereof for the client program is desirable.

SUMMARY

A stream data buffer device suitable for a client program to access or store a stream data comprises a buffer having N number of sub-buffers, a buffer agent having a sub-buffer table recording a state of a corresponding sub-buffer, wherein the state comprises a first state and a second state, and a FIFO queue to record numbers of the sub-buffers having the first state. When the client program receives and stores the stream data to the stream data buffer, the client program requests the buffer agent for a first sub-buffer having the second state to store the stream data, and after storage, the buffer agent changes the state of the first sub-buffer from the second state to the first state and transmits the number of the first sub-buffer to the FIFO queue. When a second sub-buffer having the first state is available, the client program pops the number of the second sub-buffer out of the FIFO queue and accesses the data thereof, and the buffer agent changes the state of the second sub-buffer from the first state to the second state.

A read/write method of a stream data buffer suitable for a client program to read\write stream data is provided. The stream data buffer device comprises a buffer, a buffer agent and a FIFO queue. The method comprises the following steps. The buffer is divided and numbered into a plurality of sub-buffers. A sub-buffer table is created to record a working state of a corresponding sub-buffer, wherein the working state comprises a first state and a second state. When the client program writes the stream data to the buffer, the client program requests the buffer agent for a first sub-buffer having the second state. The client program then writes the stream data to the first sub-buffer. When writing is finished or the first sub-buffer is full, the buffer agent then changes the state of the first sub-buffer from the second state to the first state and transmits the number of the first sub-buffer to the FIFO queue. When the client program reads data from the buffer, the client program requests the buffer agent for a second sub-buffer having the first state. The client program then reads the data of the first sub-buffer. When reading is finished, the client program pops the number of the second sub-buffer out of the FIFO queue and accesses the data thereof, and the buffer agent changes the state of the second sub-buffer from the first state to the second state.

DETAILED DESCRIPTION

Figure 1:
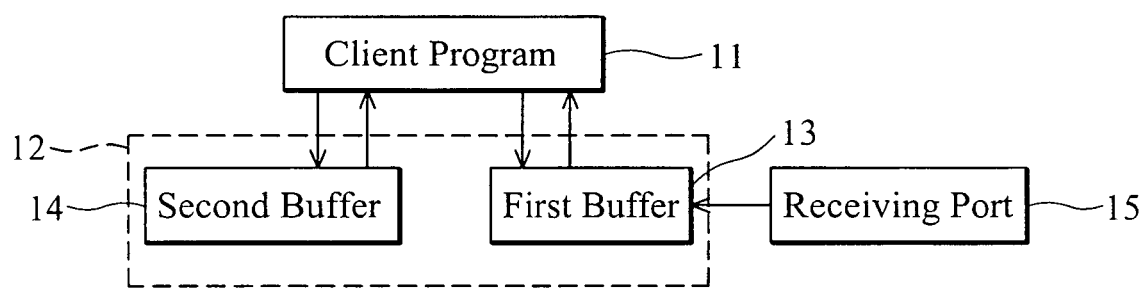
FIG. 1 is a schematic diagram of a conventional data buffer device.
Figure 2:
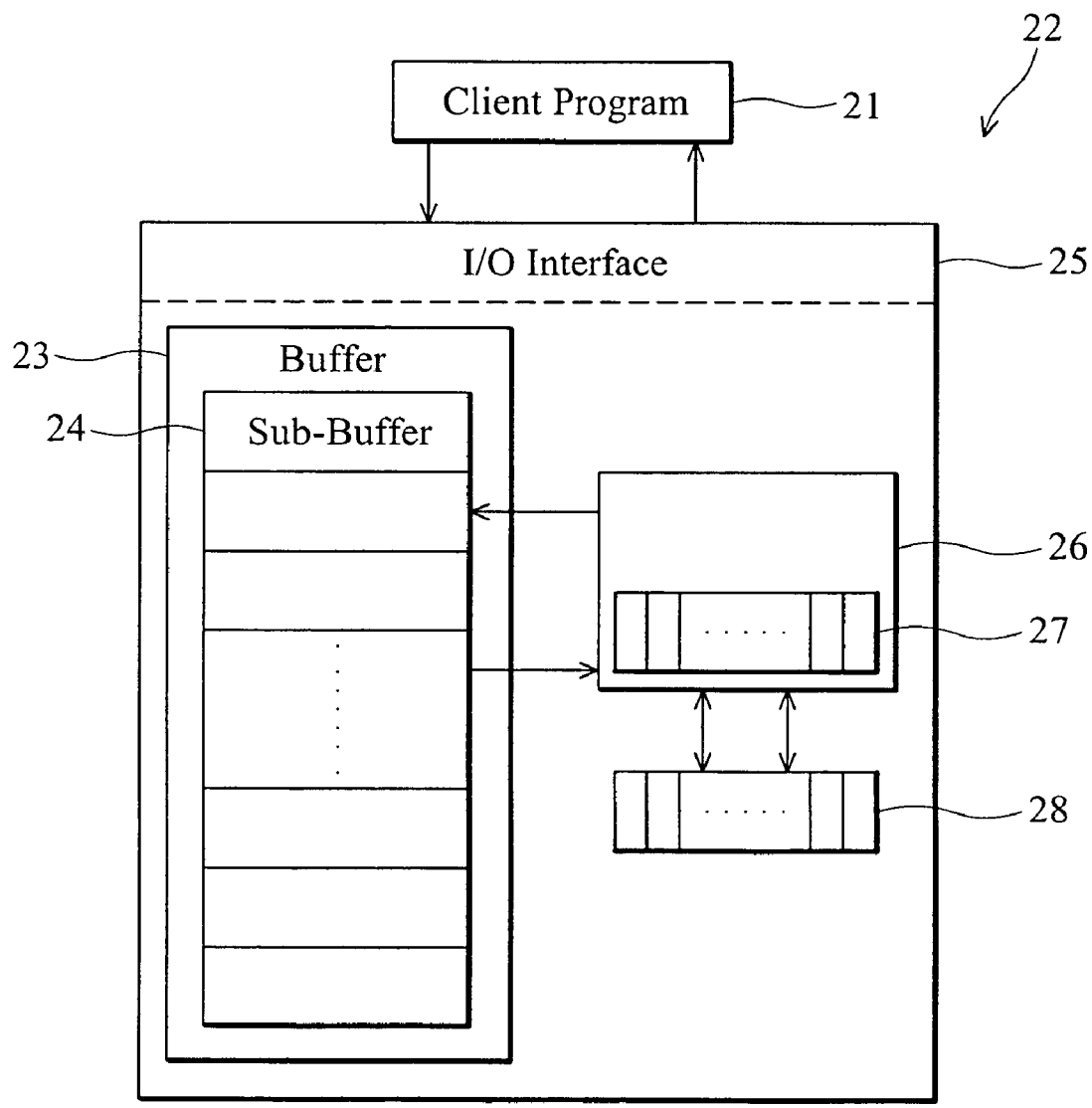
FIG. 2 is a schematic diagram of a stream data buffer device according to the invention.

FIG. 2 is a schematic diagram of a stream data buffer device according to the invention. The stream data buffer device 22 comprises a buffer agent 26, a FIFO queue 28 and a buffer 23. The buffer 23 is divided into N sub-buffers 24 and each sub-buffer has a corresponding number. The buffer agent 26 has a sub-buffer table 27 representing the state of each sub-buffer 24. If the sub-buffer 24 is not available for writing, the state of the sub-buffer 24 in the sub-buffer table 27 is logic 1. If the sub-buffer 24 is available for writing, the state of the sub-buffer 24 in the sub-buffer table 27 is logic 0. The buffer agent 26 transmits the numbers of the sub-buffers 24 having logic 1 to the FIFO queue 28. If there is any number of available sub-buffer 24 in the FIFO queue 28, the client program 21 gets the number and reads stream data of the corresponding sub-buffer 24 through the I/O interface 25. When the corresponding sub-buffer 24 is completely read, the FIFO queue 28 pops out the number and the buffer agent 26 changes the state of the corresponding sub-buffer 24 of the sub-buffer table 27 from logic state 1 to logic state 0. When the client program 21 stores the stream data to the stream data buffer device 22, the client program 21 requests the buffer agent for a number of a sub-buffer having logic 0 state and stores the stream data to the corresponding sub-buffer 24. When the stream data writing in the sub-buffer 24 being completely written or the sub-buffer 24 is full, the buffer agent 26 changes the state of the corresponding sub-buffer 24 of the sub-buffer table 27 from logic state 1 to logic state 0 and transmits the number of the corresponding sub-buffer 24 to the FIFO queue 28.

Figure 3:
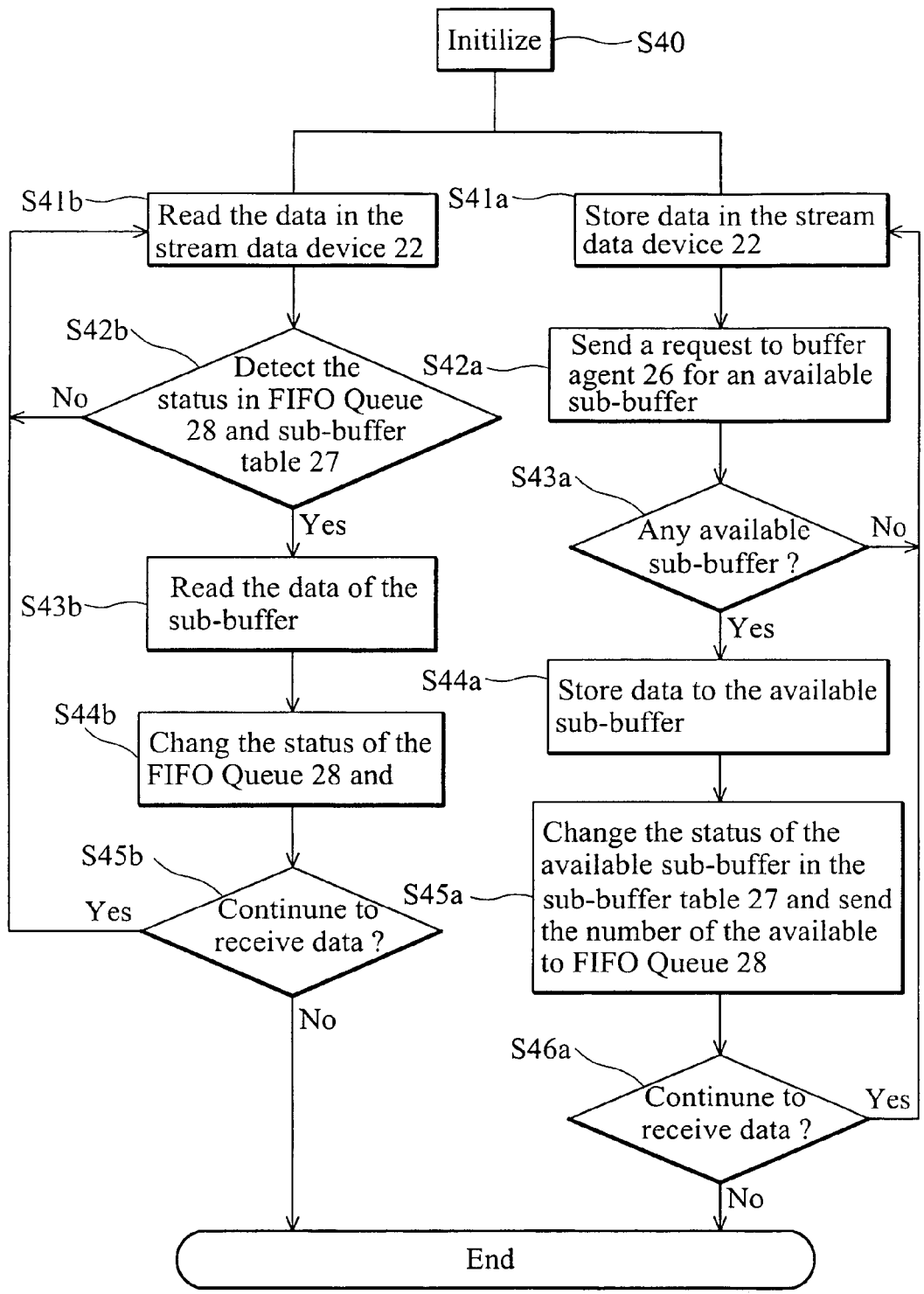
FIG. 3 is a flowchart diagram according to the embodiment illustrated in FIG. 2.

FIG. 3 is a flowchart diagram according to the embodiment illustrated in FIG. 2. The stream data buffer device 22 is initialized at step S40, and the step of initializing comprises resetting the buffer 23, sub-buffer 27 and the FIFO queue 28.

After the stream data buffer device 21 is completely initialized, the client program 21 can choose one writing path, such as the step of S41a and steps following S41a, or the reading path, such as the step of S41b and steps following S41b.

When the client program 21 writes data to the stream data buffer device 22 through the I/O interface 25, the client program 21 requests the buffer agent 26 for a sub-buffer having the state of logic 0 (Step 42a). If no sub-buffer is available, the process returns to step S41a and waits for an available sub-buffer. If there is any available sub-buffer, buffer agent 26 assign one available sub-buffer and transmits the number of the available sub-buffer to the client program 21 (step S43a). The client program 21 writes data to the corresponding sub-buffer through the I/O interface 25 according to the number (step S44a). When the writing to the sub-buffer 24 is completed or the sub-buffer 24 is full, the buffer agent 26 changes the state of the corresponding sub-buffer 24 of the sub-buffer table 27 from the second state to the first state and transmits the number of the corresponding sub-buffer 24 to the FIFO queue 28 (Step S45a). If any stream data is still written to the stream data buffer device 22, the process returns to step S41a and otherwise the process ends.

When the client program 21 reads data from the stream data buffer device 22 through the I/O interface 25, the client program 21 checks the FIFO queue 28 for any number of sub-buffer (step S42b). If there is any number in the FIFO queue 28, the client program 21 reads the corresponding sub-buffer according to the number (step S43b), and otherwise the process returns to step S41b. When the corresponding sub-buffer is completely read, the FIFO queue 28 pops out the number and the buffer agent 26 changes the state of the corresponding sub-buffer of the sub-buffer table 27 from logic state 1 to logic state 0 (step S44b). If any sub-buffer is available to read, the process returns to step S41b and otherwise the process ends.

Figure 4:
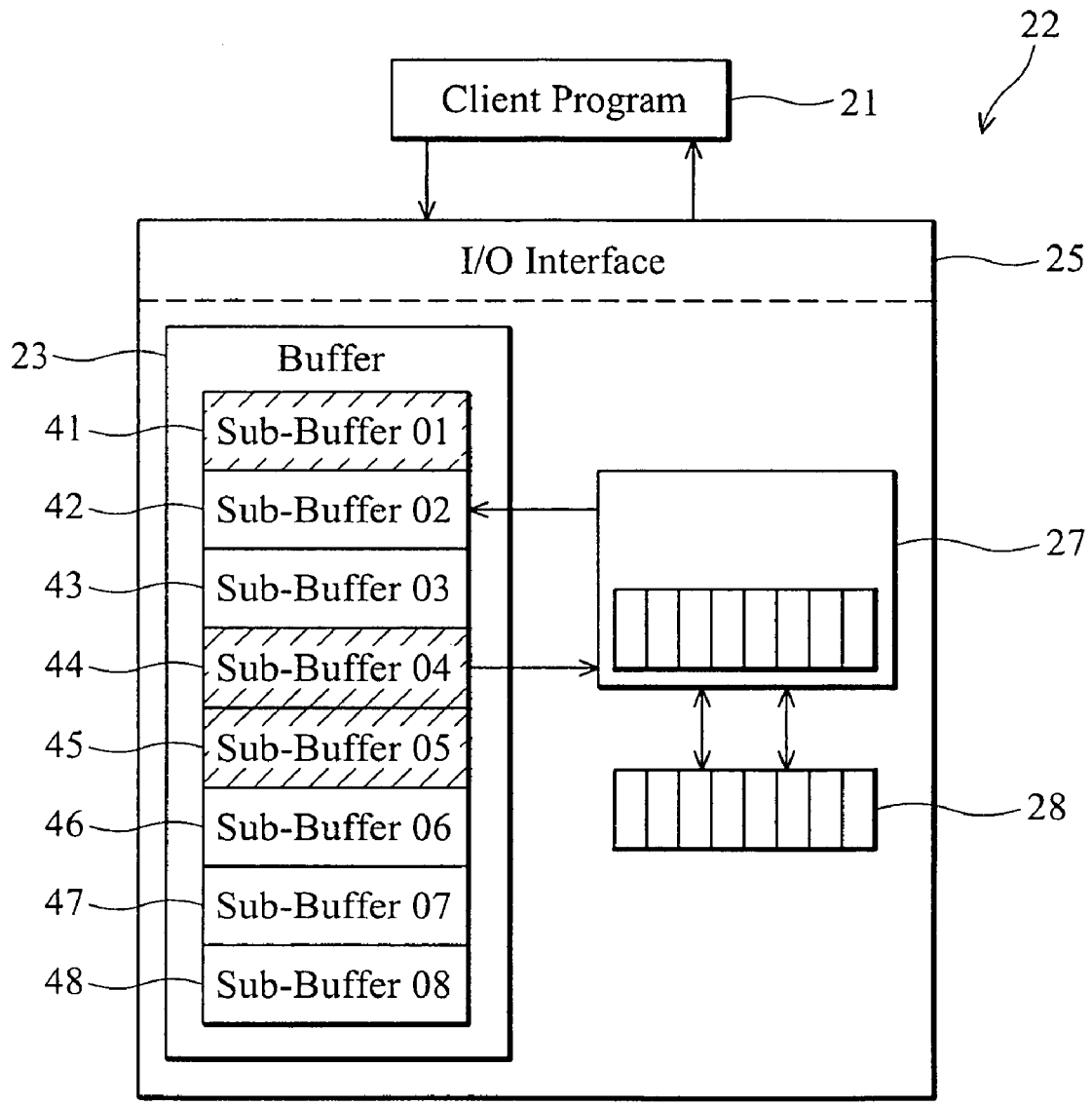
FIG. 4 is a schematic diagram of an embodiment of FIG. 3.

FIG. 4 is a schematic diagram of an embodiment of FIG. 3. In FIG. 4, buffer 23 is divided into eight sub-buffers. The sub-buffers are respectively the first sub-buffer 41 having a number 000, the second sub-buffer 42 having a number 001, and the third sub-buffer 43 having a number 010 and so on. In FIG. 3, the first sub-buffer 41, the fourth sub-buffer 44 and the fifth sub-buffer 45 are full, thus a 8 bit of data in the sub-buffer table 27 is [10011000] and the data of the FIFO queue 28 is [000, 011, 100]. When the client program 21 writing data to the stream data buffer device 22 through the I/O interface 25, client program 21 requests the buffer agent 26 for an available sub-buffer. The buffer agent 26 refers to the sub-buffer table 27 and transmits the number of the second sub-buffer 42, 001, to the client program 21, thus, the client program 21 stores the data in the second sub-buffer. When the writing is complete or the second sub-buffer 42 is full, the client program 21 informs the buffer agent 26 and the buffer agent 26 changes the states of the second buffer 42 from the logic 0 state to logic 1 state. Thus, the sub-buffer table has eight bit of data, [11011000], and the data of the FIFO queue is [000, 011, 100, 001].

When the client program 21 reads data from the stream data buffer device 22 through the I/O interface 25, the client program 21 refers to the FIFO queue 28 and gets a number of the first sub-buffer 41 full, 000. The client program 21 reads the data of the first sub-buffer 21 and the FIFO queue 28 cleans the number of the first sub-buffer 41, thus the data of the FIFO queue is [011, 100, 001]. When the reading is complete, the client program 21 informs the buffer agent 26 to change the state of the first sub-buffer 41 from the logic 1 state to the logic 0 state, thus, the sub-buffer table has eight bit of data [01011000].

Figure 5:
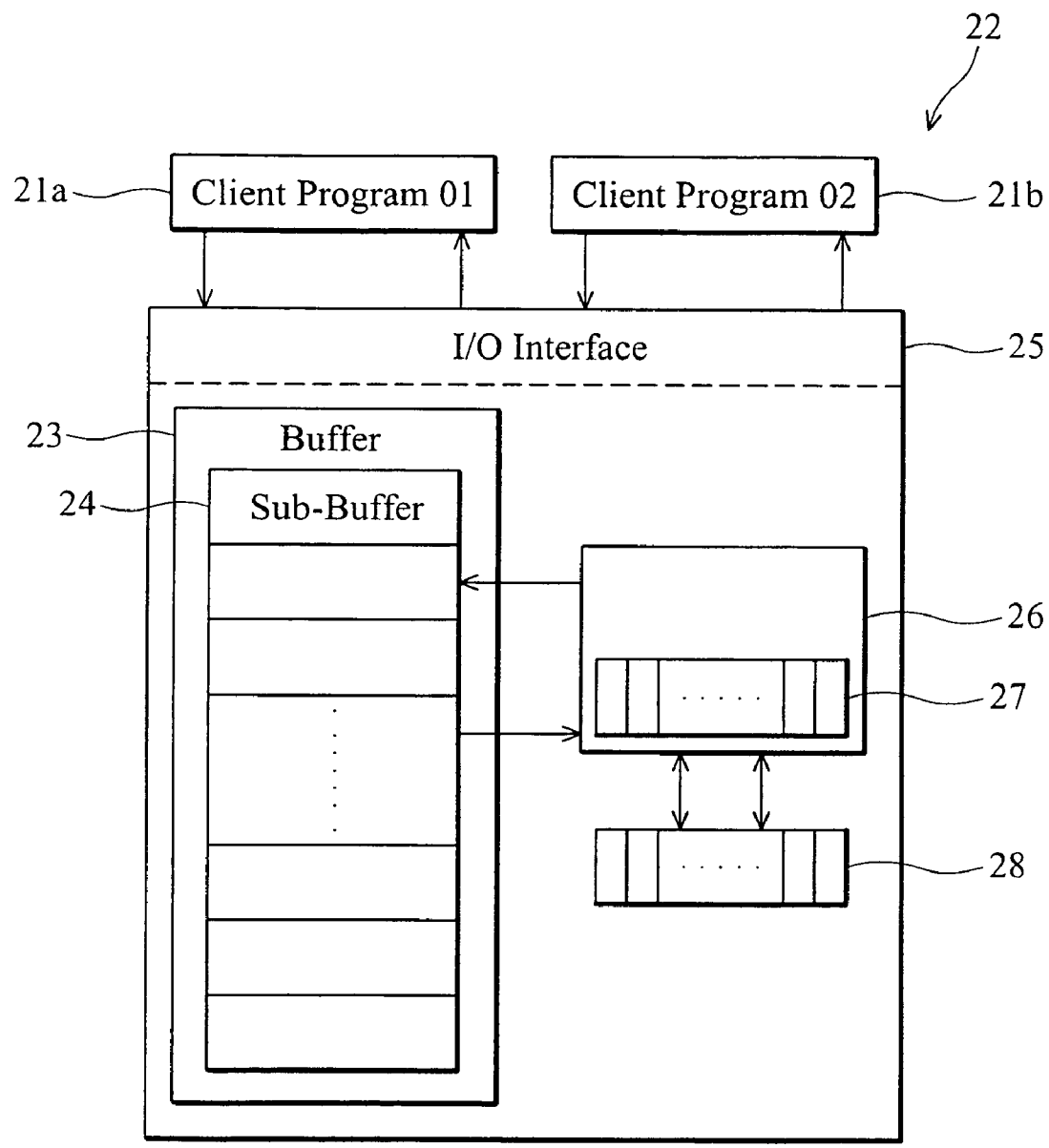
FIG. 5 is a schematic diagram of another embodiment of two client programs using the same stream data buffer device according to the invention.

FIG. 5 is a schematic diagram of another embodiment of two client programs using the same stream data buffer device according to the invention. The client program 21a, the client program 21b and the stream data buffer device 22a work substantially the same as the client program 21 and the stream data buffer 22 of the FIG. 2 and the difference between the stream data buffer device 22a and the stream data buffer 22 is the data stored in the FIFO queue 28. Since the client programs 21a and 21b may use the same stream data buffer device 22a at the same time, it is desirable to differentiate between sub-buffers storing data for client program 21a and sub-buffers storing data for client program 21b. In FIG. 5, the client program 21a has an identification number 01 and the client program 21b has an identification number 10, thus, the data of FIFO queue 28 comprises the number of the sub-buffer and the identification number of the corresponding client program. For example, if the data of the FIFO queue 28 is [01000, 01001, 10010, 10011]. This indicates that the data of sub-buffers number 000 and 001 are used for the client program 21a, and the data of sub-buffers of the number 010 and 011 are used for the client program 21b.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stream data buffer device suitable for a client program to access or store a stream data, comprising:

a buffer having N numbered sub-buffers to store the stream data;

a buffer agent having a sub-buffer table recording a state of a corresponding sub-buffer, wherein the state comprising a first state and a second state; and a FIFO queue to record numbers of the sub-buffers having the fist state, wherein when the client program receives and stores the stream data to the stream data buffer, the client program requests the buffer agent for a first sub-buffer having the second state to store the stream data, and after storage, the buffer agent changes the state of the first sub-buffer from the second state to the first state and transmits the number of the first sub-buffer to the FIFO queue;

when a number of a second sub-buffer having the first state is available, the client program pops the number of the second sub-buffer out of the FIFO queue and accesses the data thereof, and the buffer agent changes the state of the second sub-buffer from the first state to the second state.

2. The stream data buffer device of claim 1, wherein the first state is logic 1.

3. The stream data buffer device of claim 1, wherein the second state is logic 0.

4. The stream data buffer device of claim 1, wherein the sub-buffer is an N-bits register.

5. The stream data buffer device of claim 1, wherein the buffer is a dynamic random access memory.

6. The stream data buffer device of claim 1, wherein the buffer is a flash ram.

7. A read/write method of a stream. data buffer suitable for a client program to read/write a stream data, wherein the stream data buffer device comprises a buffer, a buffer agent and a FIFO queue, comprising:

dividing and numbering the buffer into a plurality of sub-buffers;

creating a sub-buffer table to record a working state of a corresponding sub-buffer, wherein the working state comprises a first state and a second state;

when the client program writes the stream data to the buffer:

the client program requests the buffer agent for a first sub-buffer having the second state;

the client program writes the stream data to the first sub-buffer; and when the stream data being written to the first sub-buffer is completely written or the first sub-buffer is full, the buffer agent changes the state of the first sub-buffer from the second state to the first state and transmits the number of the first sub-buffer to the FIFO queue; and when the client program reads data from the buffer:

the client program requests the buffer agent for a second sub-buffer having the first state;

the client program read the data of the second sub-buffer; and when the data of the second sub-buffer being completely read, the client program pops the number of the second sub-buffer out of the FIFO queue and accesses the data thereof, and the buffer agent changes the state of the second sub-buffer from the first state to the second state.

8. The method of claim 7, wherein further comprises the step:

initializing the stream data buffer.

9. The method of claim 8, wherein the step of initializing the stream data buffer further comprises:

resetting the buffer;

resetting the sub-buffer table; and resetting the FIFO queue.

10. The method of claim 7, wherein the first state indicates that the corresponding sub-buffer is available for reading and the second state indicates that the corresponding sub-buffer is available for writing.

11. The method of claim 7, wherein the first state is logic 1.

12. The method of claim 1, wherein the second state is logic 0.

* * * * *